May 31, 1932.  T. RAY ET AL  1,861,163
SEPARATOR
Filed Dec. 19, 1927
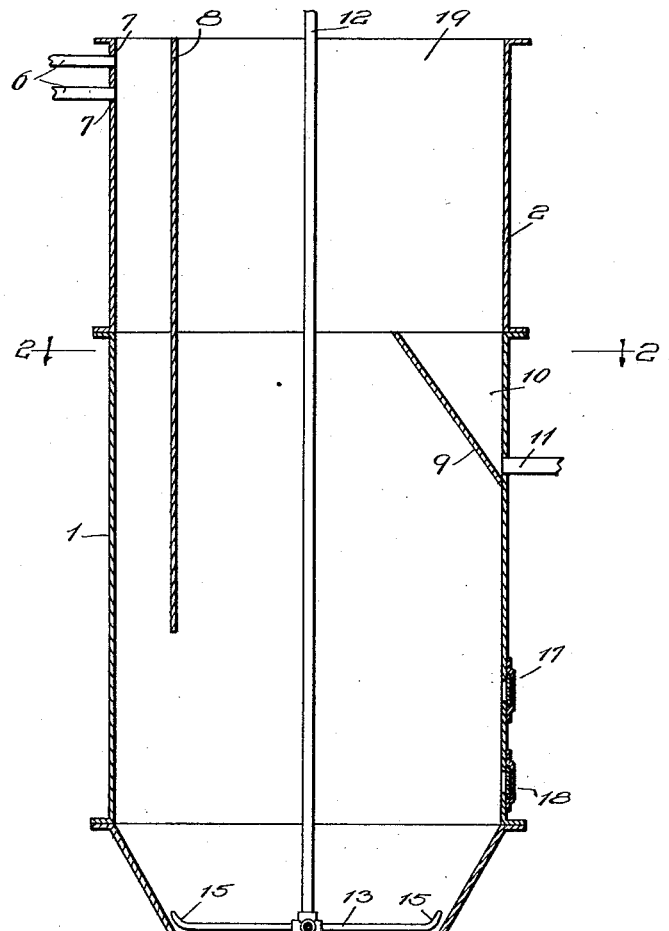
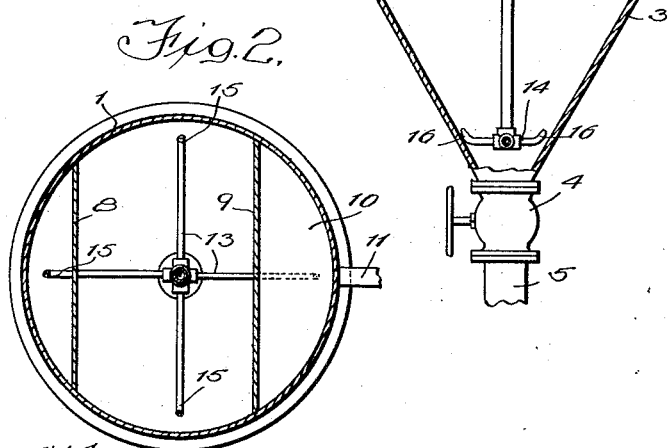
Inventors
Joshua R. Ray
Thomas Ray Patented May 31, 1932

1,861,163

UNITED STATES PATENT OFFICE

THOMAS RAY AND JOSHUA R. RAY, OF MANISTEE, MICHIGAN

SEPARATOR

Application filed December 19, 1927. Serial No. 241,049.

This invention pertains to the general class of apparatus used in the manufacture of crystalline substances and particularly to the class of devices for the purpose of separating the crystallized substance from the brine and suspended impurities therein. An object of applicants' invention is the production of a separator simple in construction of low cost, high efficiency, positive in operation, dependable and satisfactory.

A further object of applicants' invention is the production of a separator for the purpose of separating precipitated salt from the brine, and particularly from the impurities encountered in the purification and manufacture of salt.

A further object of applicants' invention is the production of a separator for the purpose of separating the salt from the brine and gypsum.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a sectional elevation of applicants' novel separator; and

Fig. 2 is a section on line 2—2 of Fig. 1.

Referring now to Fig. 1, 1 represents a hollow body casing preferably of uniform diameter and vertical. Attached at the top of the casing 1 is a similar casing 2. At the bottom of casing 1 is a converging and preferably frustro-conical casing 3, at the bottom of which is connected a valve 4. Leading from the valve 4 is a pipe 5.

The brine, together with the salt and impurities, enters the separator at the top thereof through pipes 6 opening into casing 2 through apertures 7. Opposite the apertures 7 and spaced therefrom is a vertically arranged baffle plate 8 secured to the inner sides of casings 1 and 2. An inclined baffle 9 is attached at its lower and side edges to the inner wall of casing 1, forming therewith a wedge-shaped pocket 10 as clearly shown in Fig. 1. Baffle 9 is preferably disposed on one side of casing 1 and baffle 8 on the other side. However, baffle 9 does not extend upward into casing 2, or in other words, the top edge of the baffle 9 is spaced from the top of the separator. A suitable outlet 11 leads from the wedge-shaped pocket 10.

Extending downward through the center of casings 2, 1 and 3, is a pipe 12, to the bottom of which are attached a plurality of radially disposed jets 13 and 14. Jets 13 and jets 14 are disposed within the casing 3. Jets 13 are disposed above the jets 14. Jets 13 and 14 are preferably turned upwardly at their ends 15 and 16, respectively. These ends 15 and 16 are adjacent the inner wall of the casing 3.

Arranged in the wall of casing 1 and preferably at the bottom thereof are sight glasses 17 and 18. Sight glass 17 is disposed above and spaced from sight glass 18. These sight glasses are of any suitable construction and provide means for looking through into the inner portions of the separator.

The operation of the device is as follows: The brine, salt and impurities enter the separator through pipes 6 and apertures 7 which may be of any number. The brine, salt and impurities entering into the pipes 6 may come from a vacuum pan. Upon entering the aperture 7 the salt, brine and impurities strike baffle plate 8. The velocity of the mixture is greatly decreased on reaching the interior of the separator and upon striking baffle 8 and the salt settles to the bottom of the separator. The gypsum and other impurities, although many of them are heavier than the salt, are suspended in the moving brine. When the level of the liquid reaches the top of baffle 9, the brine and impurities flow over the upper edge thereof and into the pocket 10 and out through the opening 11, from whence they may either go back to the evaporator, to a filter or to any other device used in connection with the separator. A continuous appreciable flow of brine over baffle 9 is preferable. The level of the salt in the separator is preferably kept constant and is controlled by valve 4 at the bottom of casing 3. The salt is led off continuously through pipe 5 to a centrifugal or other suitable apparatus, same not forming a part of this invention. The level of the salt is preferably maintained above sight glass 18 and below sight glass 17. Sight glasses 17 and 18 therefore provide means of maintaining this level. The salt at times has a tendency of forming a thick cone about the inner walls of casing 3. In order that all of the salt in the casing 3 will pass through the valve 4, jets 13 and jets 14 are provided, which jets spray fresh brine or any other liquid along the inner surface of casing 3; thus breaking up the tendency of the crystals to bridge across the opening in the bottom of the casing. The brine or other liquid is supplied to jets 13 and jets 14 through pipe 12. Pipe 12 may be supplied from any source. The top 19 of the separator is preferably open. Pipe 12 together with jets 13 and 14 are removable at will for inspection and other purposes.

Having thus described our invention, it is obvious that various immaterial modifications may be made in the same without departing from the spirit of our invention; hence we do not wish to be understood as limiting ourselves to the exact form, construction, arrangement and combination of parts herein shown and described, or uses mentioned.

What we claim as new and desire to secure by Letters Patent is:

1. In a device of the class described, a casing having a converging bottom, a conduit extending longitudinally and substantially centrally of said casing, means for separating material adhering to said converging bottom, said means including a plurality of radial jets communicating with said conduit and having upwardly opening outlets adjacent the wall of said converging bottom disposed adjacent the opposite ends of said converging bottom, said casing having an outlet disposed beneath said jets, and valve means for controlling the passage of material through said outlet.

2. In a device of the class described, a casing having a converging bottom, a conduit extending longitudinally and substantially centrally of said casing, means for removing material adhering to said converging bottom, said means including a plurality of radial jets communicating with said conduit and having outlets adjacent the opposite extremities of the converging bottom, said casing having an outlet disposed beneath said jets, valve means for controlling the passage of material through said outlet, an inlet in said casing, a baffle disposed opposite said inlet, and a second baffle attached to the inner wall of said casing and forming therewith a pocket, said casing having an outlet for withdrawing material from said pocket.

3. In a device of the class described, the combination of a casing having a valve controlled converging bottom, an inlet located at the top of the casing, a baffle wall arranged to provide a duct within said casing which extends from said inlet to adjacent the converging bottom, an element extending inwardly of the casing providing an upwardly opening pocket, said pocket being located above the lower termination of said baffle wall and below the upper end of the casing, an outlet leading from said pocket, and means for facilitating flow toward said pocket providing means for separating material adhering to the converging bottom.

4. In a device of the class described, the combination of a casing having a valve controlled converging bottom, an inlet located at the top of the casing, a baffle wall arranged to provide a duct within said casing which extends from said inlet to adjacent the converging bottom, an element extending inwardly of the casing providing an upwardly opening pocket, said pocket being located above the lower termination of said baffle wall and below the upper end of the casing, an outlet leading from said pocket, and means for facilitating flow toward said pocket providing means for separating material adhering to the converging bottom, said means including jets located within and adjacent the wall of said converging bottom.

5. In a device of the class described, a casing having a converging bottom, the smaller end of said bottom providing an outlet, a valve controlling said outlet, an inlet and an outlet for said casing, and means for conducting fluid, said means having an element thereof located adjacent the smaller end of said converging bottom and adjacent the upper end of said converging bottom extending along the converging bottom providing means for separating material adhering to the converging bottom.

6. In a device of the class described, a casing having a converging bottom, the smaller end of said bottom providing an outlet, a valve controlling said outlet, an inlet and an outlet for said casing, and jets located adjacent the smaller end of said converging bottom and adjacent the upper end of said converging bottom extending toward the larger end of said bottom providing means for separating material adhering to the converging bottom.

7. In a device of the class described, a casing having converging bottom open at its smaller end and a valve located at said end, an inlet to said casing, an outlet for said casing, jets arranged adjacent the wall of said bottom and disposed adjacent the opposite extremities of said converging bottom and arranged to discharge fluid toward an end of said bottom along the wall of said bottom.

In testimony whereof, I have hereunto signed my name.

THOMAS RAY.

In testimony whereof, I have hereunto signed my name.

JOSHUA R. RAY.